July 7, 1970     B. N. MOROZOVSKY     3,519,902

SPIRAL PLATE CAPACITOR

Filed April 2, 1969

INVENTOR
BOHDAN N. MOROZOVSKY

BY

ATTORNEY

United States Patent Office 3,519,902
Patented July 7, 1970

3,519,902
SPIRAL PLATE CAPACITOR
Bohdan N. Morozovsky, Redwood City, Calif., assignor to International Telephone and Telegraph Corporation, New York, N.Y., a corporation of Delaware
Filed Apr. 2, 1969, Ser. No. 812,835
Int. Cl. H01g 3/02
U.S. Cl. 317—260                                            9 Claims

ABSTRACT OF THE DISCLOSURE

The invention includes a brace connection between two outer end turns of two interleaved spiral plates of a vacuum capacitor. Conventionally, the spiral plates are brazed at one spirally-wound edge to two rigid, conductive end plates which also serve as the capacitor terminals. However, the other spiral edge of each plate is unsupported and especially at the corner of a plate at its outermost terminal edge. This corner is tied down by the brace connection. The physical strength and electrical properties of the capacitor are, thus, much improved. Thus, the capacitor does not easily become susceptible to damage and does not exhibit poor electrical operating characteristics due to mechanical vibration.

Background of the invention

This invention relates to electrical components and, more particularly, to capacitors having a pair of insulated, rigid, spiral conductive plates.

The invention will have utility in other environments and should not be limited to those shown or described herein. However, the invention has been found to be especially useful in vacuum capacitors.

In the past, it has been the practice to form two spaced, interleaved spiral strips for a vacuum capacitor. A rigid, conductive end plate, which acts both as a portion of the evacuated envelope and as an electrical terminal, is brazed to one spiral edge of each strip. The other spiral edge of each strip is then held spaced from but contiguous to a corresponding end plate. Even though the said other edge of each strip, thus, is unsupported, the brazed end plates lend rigidity to the strips. The continuous character of the spiral form of the strips also lends rigidity when the strips are themselves rigid. However, the outer or last turn of each strip has a terminal edge. At positions spaced from the end plates, these terminal edges have little support from the brazed end plates or from the characteristic spiral form of the strips. This is especially true at the extreme unsupported corner where the unsupported spiral edge meets with the said terminal edge.

The unsupported corner and terminal edge of each strip, thus, can be more easily bent or damaged during or after fabrication. However, it is an outstanding disadvantage of such prior art construction that the mechanical and electrical operating characteristics of the capacitor deteriorate seriously when the capacitor is subjected to vibration.

Summary of the invention

In accordance with the device of the present invention, the above-described and other disadvantages of the prior art are overcome by bracing one or both of the strips.

According to one feature of the invention, this bracing is done by tieing the terminal edge of a strip to the next preceding turn of the self-same strip.

According to an outstanding feature of the invention, both strips are braced by terminating one strip short of the other. The next preceding turn of the other strip, thus, is laid bare and the terminal edge of the other strip is placed in direct contact with its preceding turn all along the length of the said terminal edge. Moreover, then the unsupported corner of the said other strip may be welded to the said next preceding turn. At the same time, the said next preceding turn is provided with a hole therethrough at the terminal edge of the said one strip. Then, the one strip is provided with an integral tab which extends through the hole and is soldered to the next preceding turn of the self-same said one strip.

The tab is physically spaced from and insulated from the edge of the hole. Thus, both strips and all connective connections thereto are insulated apart; and the strips are separated throughout their entire lengths. Thus, the strips can properly act as the plates of the capacitor; however, the bracing just described makes the terminal edges of the strips rigid and structurally strong to avoid damage. The strips also will not vibrate substantially and, therefore, do not induce the said serious mechanical and electrical operating difficulties attendant upon the use of prior art capacitors.

The free-standing, inner electrode of a prior art capacitor may have two resonant frequencies of vibration. These frequencies may be, for example 520 Hz. where only the unattached end vibrates and 760 Hz. where the entire inner electrode vibrates. However, by employing the capacitor of the present invention, resonance at the frequency of 520 Hz. may be eliminated.

The above-described and other advantages of the invention will be better understood from the following description when considered in connection with the accompanying drawings.

Brief description of the drawing

In the drawing, which is to be regarded as merely illustrative.

Description of the preferred embodiment

Figure 1:
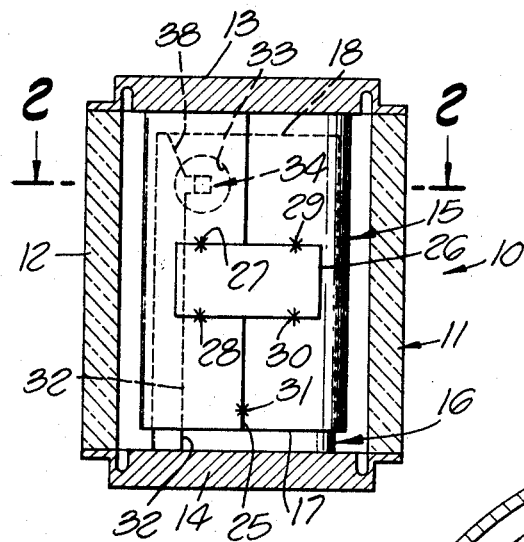
FIG. 1 is a side elevational view, partly in section, of a vacuum capacitor constructed in accordance with the present invention.

In the drawing, in FIG. 1, a vacuum capacitor is indicated at 10 including an evacuated envelope 11. Envelope 11 has a ceramic cylinder 12 with rigid conductive end plates 13 and 14 brazed thereto similar to those shown in U.S. Pat. No. 3,346,933.

The spiral edge of one rigid conductive strip 15 is brazed to plate 13. One spiral edge of a rigid conductive strip 16 is brazed to plate 14. Strip 15 terminates at 17 in spaced relation to plate 14. Similarly, strip 16 terminates at 18, spaced from plate 13.

Figure 2:
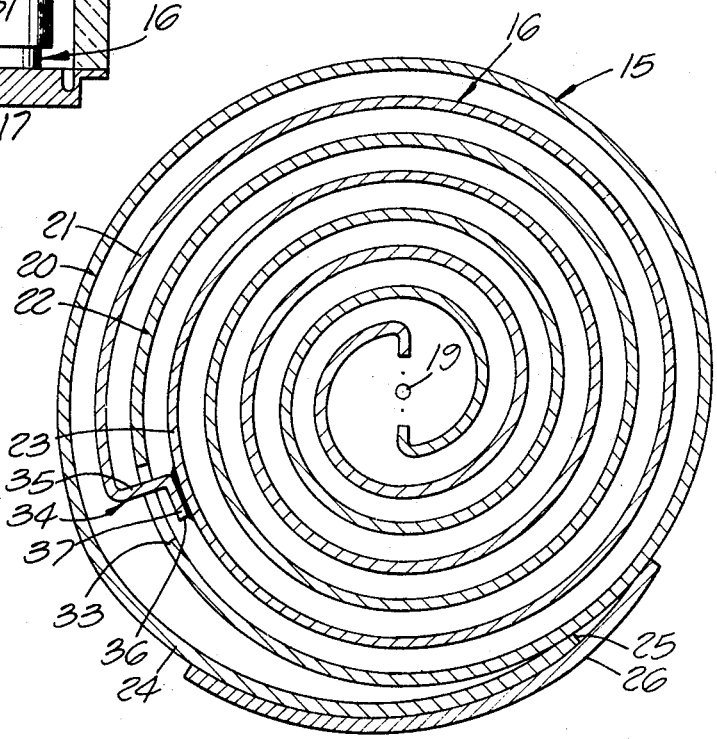
FIG. 2 is a transverse sectional view through a portion of the capacitor taken on the line 2—2 shown in FIG. 1.

As shown in FIG. 2, strips 15 and 16 are wound into a spiral having an axis perpendicular to the view, approximately at a point 19. As shown in FIG. 2, the spiral has a last turn 20, a second to last turn 21, a third to last turn 22, and a fourth to last turn 23. As shown in both FIGS. 1 and 2, last turn 20 has a terminal end portion 24 and a terminal edge 25 that lies in a plane on an axis 19. A conductive metal strip 26 extends across terminal edge 25 from a position in engagement with portion 24 of turn 20 to a position in engagement with turn 22. Tape 26 is welded to turn portion 24 at 27 and 28. Tape 26 is welded to turn 22 at 29 and 30. Turn portion 24 is also welded to turn 22 at 31.

Figure 3:
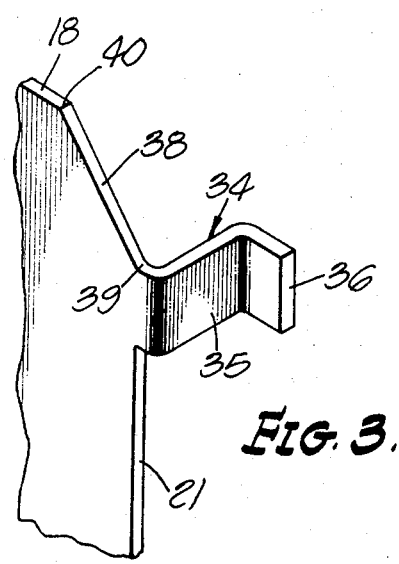
FIG. 3 is a perspective view of a portion of one plate of the capacitor taken on the line 3—3 shown in FIG. 2.

Turn 21 has a terminal edge 32 shown in FIGS. 1 and 3 which is parallel to terminal 25 but spaced therefrom. Turn 21, thus, is shorter than turn 20. An approximately circular hole 33 is provided through turn 22 as shown in FIGS. 1 and 2. Turn 21 has a generally L-shaped tab 34 integral therewith near the unsupported spiral edge 18 and strip 16. Tab 34 is shown in all three FIGS. 1, 2, and 3. As shown in FIG. 2, tab 34 has one leg 35 which projects through hole 33. As shown in both FIGS. 1 and 2, leg 35 is everywhere spaced from the edge of hole 33 so that no physical or electrical contact is made between turns 21 and 22. Tab 34 also has a leg 36 which conforms to the approximately cyclindrical shape of the outer surface of turn 23 and is soldered thereto at 37 as shown in FIG. 2.

An end corner of the terminal portion of turn 21 shown in FIG. 3 is cut off leaving an approximately straight diagonal edge 38 which extends between the upper end of tab 34 at 39 to the end of spiral edge 18 at 40.

End plates 13 and 14 form an integral portion of evacuated envelope 11. End plates 13 and 14 may be identical to those shown in the said patent. The same is true of ceramic cylinder 12 and its connection with plates 13 and 14. In addition, all structures connected with plates 13 and 14, not shown, may be identical to those shown in the said patent with the exception of strips 15 and 16 and tape 26. Thus, for example, suitable terminals, not shown, may be provided on plates 13 and 14 so that electrical connections may be made to strips 15 and 16. The brazed connection of plate 13 with strip 15, thus, in addition to providing a structural rigidity, provides an electrical connection. The same is true of the brazed joint of plate 14 and strip 16.

In accordance with the foregoing, it will be appreciated that turns 20 and 22 are in fact integral portions of the self-same strip 15. Similarly, turns 21 and 24 are integral portions of the self-same strip 16. The welds at 27, 28, 29, 30, and 31, although they provide substantial structural rigidity for the end portion 24 and turn 20, do not short out the strips 15 and 16 which act as the capacitor plates because turns 20 and 22, which are physically and electrically connected together by all of the said welds, are turns of the self-same strip 15. Similarly, the soldered joint 37 between tab 34 and turn 23 does not short out the capacitor because turns 21 and 23, which are physically and electrically connected together by joint 37, are turns of the self-same strip 16. Moreover, hole 33 in turn 22 and the spacing of tab leg 35 from the edge of the hole 33 insures that no electrical connection is made between either of the turns 21 and 23, and the turn 22.

In accordance with the foregoing, it will be appreciated that the construction of the capacitor 10 of the present invention provides a highly rigid and strong structure. For example, tape 26 keeps the entire terminal edge 25 of turn 20 in physical and electrical contact with the outside surface of turn 22. Further, the welds at 27, 28, 29, and 30 serve to stabilize the position of the terminal portion 24 of turn 20. The unsupported corner where spiral edge 17 and terminal edge 25 meet is also welded in a fixed position at 31.

The end portion of turn 21 shown in FIG. 3 near spiral edge 18 is braced and fixed at the position of solder joint 37, tab leg 36, and turn 23. Moreover, the extreme corner of turn 21 which has been cut off at 38 is prevented from inducing unwanted mechanical vibration or resonance.

As a result of the bracing connection between the turns of strips 15 and 16, the capacitor 10 of the present invention is less susceptible to damage before, during, and after fabrication. Still further, the said mechanical and electrical operating difficulties due to mechanical vibration which are attendant in the use of prior art capacitors, thus, are avoided in practice of the present invention.

Variable vacuum capacitors are not well known in the art. These devices normally involve moving one conductive strip axially into or out of another. Thus, although the present invention has been described in connection with a fixed capacitor rather than a variable capacitor, the present invention is equally applicable to a variable capacitor. In such a case, it may be necessary to elongate slot 33 in the vertical direction shown in FIG. 1 if the relative axial movements of strips 15 and 16 should be greater than the clearance already provided between tab leg 35 and edge of the hole 33.

Although the spiral edges of strips 15 and 16 are bonded to plates 13 and 14, the edges of strips 15 and 16 may be fixed together by any other conventional means. For example, two spiral strips may be inserted into each end of the spiral and brazed between the turns thereof.

Although certain specific bracing means have been disclosed hereinbefore, the invention also applies to parallel or criss-cross or radial bracing members.

Note will be taken that the invention is practiced either by providing reinforcement vertically, for example along the terminal edge 25 of turn 20, or radially as in the case of tab leg 35.

Note will be taken that tab 34 need not be conductive and need not be integral with turn 21. Moreover, if tab 34 is a dielectric, it may be wedged and not bonded or bonded between turns 21 and 23, as desired. In either case, it will serve as a bracing spacer. Further, tab 34 may take the form of a dielectric grommet in hole 33. As described above, no structure exists between the parallel spiral surfaces of strips 15 and 16. The dielectric between strips 15 and 16, which act as the capacitor plates, is thus simply a high vacuum. The magnitude of this vacuum is conventional. Notwithstanding the fact that no material dielectric located between strips 15 and 16 is disclosed herein, a different dielectric may in fact be inserted between strips 15 and 16. For example, this dielectric may be a gas or liquid at any suitable pressure or vacuum or a solid or perforate dielectric as disclosed in the said patent.

What is claimed is:

1. A capacitor comprising: two spaced, rigid, conductive strips wound together in a spiral, each turn of one strip being spaced from each other and from each turn of the other strip; means bonding the spiral edges of the turns of one strip in fixed positions relative to each other at one end of the spiral; means bonding the spiral edges of the turns of the other strip in fixed positions relative to each other at the other end of the spiral, said one strip projecting axially beyond said other strip at said one end of said spiral, said other strip projecting axially beyond said one strip at said other end of the spiral, said one strip thereby having turns with unsupported spiral edges near the other end of said spiral and said other strip thereby having turns with unsupported spiral edges near said one end of said spiral; and brace means spaced from the means bonding the turn edges of said one strip, said brace means being fixed between the self-same said one strip at two different locations thereon, said second to last turn of said spiral terminating prior to the last outer turn thereof, said spiral having a third to last turn and a fourth to last turn, said last turn and said third to last turn having a metal tape positioned against and welded to both, said tape extending across the terminal edge of said last turn, said last turn and said third to last turn being integral portions of the self-same said other strip, said second to last turn and said fourth to last turn being integral portions of the self-same said one strip, major portions of the outer terminal edges of both of said strips lying in planes through the axis of said spiral, said brace means including a generally L-shaped tab integral with said one strip and bent to shape, said tab having a first leg fixed to the terminal edge of said one strip closer to but spaced from the unsupported spiral edge thereof, said first leg extending radially to the position of the outside surface of said fourth to last turn, said tab having a second leg conforming to the shape of the outside surface of said fourth to last turn and being soldered thereto, said third to last turn having a hole therethrough, said first leg extending through said hole in spaced relation to the edge thereof out of physical contact with said other strip, the unsupported outer terminal corner of said one strip being cut off from the position of said tab to the unsupported spiral edge thereof, said bonding means both including a rigid, flat, conductive plate brazed to the spirally wound edge of each corresponding strip, each strip having a uniform width throughout its entire length, except for said cut-off corner and said tab, said bonded edges thereof lying in parallel planes perpendicular to the axis of said spiral.

2. A capacitor comprising: two spaced, rigid, conductive strips wound together in a spiral, each turn of one strip being spaced from each other and from each turn of the other strip; means bonding the spiral edges of the turns of one strip in fixed positions relative to each other at one end of the spiral; means bonding the spiral edges of the turns of the other strip in fixed positions relative to each other at the other end of the spiral, said one strip projecting axially beyond said other strip at said one end of said spiral, said other strip projecting beyond said one strip at said other end of the spiral, said one strip thereby having turns with unsupported spiral edges near the other end of said spiral and said other strip thereby having turns with unsupported spiral edges near said one end of said spiral; and brace means spaced from the means bonding the turn edges of said one strip, said brace means being fixed between the self-same said one strip at two different locations thereon, said spiral having a last turn, a second to the last turn, a third to last turn, and a fourth to last turn, said last turn and said third to last turn being integral portions of the self-same said other strip. said second to last turn and said fourth to last turn being integral portions of the self-same said one strip, said third to last turn having an opening therethrough, said brace means including a member in engagement with said second to last turn near the terminal edge thereof spaced from the bonding means fixed thereto, said member extending through said opening into engagement with said fourth to last turn.

3. The invention as defined in claim 2, wherein the terminal portion of said last turn is welded in a fixed position relative to said third to last turn, said last turn having a terminal edge projecting beyond the terminal edge of said second to last turn and extending to a position in engagement with the outer surface of said third to last turn.

4. The invention as defined in claim 2, wherein said member is a tab integral with and projecting from said one strip near the terminal edge thereof and near the unsupported spiral edge thereof, said tab being spaced from the edge of said opening out of physical contact with said other strip, said tab being soldered to said fourth to last turn.

5. The invention as defined in claim 4, wherein the terminal portion of said last turn is welded in a fixed position relative to said third to last turn, said last turn having a terminal edge projecting beyond the terminal edge of said second to last turn and extending to a position in engagement with the outer surface of said third to last turn.

6. The invention as defined in claim 2, wherein said member is fixed to both of said second and fourth to last turns.

7. The invention as defined in claim 6, wherein said member is a tab integral with and projecting from said one strip near the terminal edge thereof and spaced from the bonded spiral edge thereof, said tab being spaced from the edge of said opening out of physical contact with said other strip, said tab being electrically bonded to said fourth to last turn in a fixed position relative thereto.

8. The invention as defined in claim 7, wherein the terminal portion of said last turn is welded in a fixed position relative to said third to last turn, said last turn having a terminal edge projecting beyond the terminal edge of said second to last turn and extending to a position in engagement with the outer surface of said third to last turn.

9. The invention as defined in claim 6, wherein the terminal portion of said last turn is welded in a fixed position relative to said third to last turn, said last turn having a terminal edge projecting beyond the terminal edge of said second to last turn and extending to a position in engagement with the outer surface of said third to last turn.

References Cited

UNITED STATES PATENTS

| 3,292,063 | 12/1966 | Kellerman | 317—260 |
| 3,377,531 | 4/1968 | Lindsay | 317—260 X |

FOREIGN PATENTS 616,046  1/1949  Great Britain.

ELLIOT A. GOLDBERG, Primary Examiner

U.S. Cl. X.R.

317—244